US 6,701,022 B2

(12) United States Patent
Hirao et al.

(10) Patent No.: US 6,701,022 B2
(45) Date of Patent: Mar. 2, 2004

(54) PATTERN MATCHING CODING DEVICE AND METHOD THEREOF

(75) Inventors: Kouichiro Hirao, Tokyo (JP); Takahiro Hongu, Tokyo (JP)

(73) Assignee: NEC Corporation, Tokyo (JP)

( * ) Notice: Subject to any disclaimer, the term of this patent is extended or adjusted under 35 U.S.C. 154(b) by 589 days.

(21) Appl. No.: 09/760,776

(22) Filed: Jan. 17, 2001

(65) Prior Publication Data

US 2001/0008564 A1 Jul. 19, 2001

(30) Foreign Application Priority Data

Jan. 18, 2000 (JP) ........................................ 2000-008709

(51) Int. Cl.[7] .............................. G06K 9/36; G06K 9/00; G06K 9/68
(52) U.S. Cl. ........................ 382/253; 382/181; 382/218; 382/244; 382/246
(58) Field of Search ................................. 382/181, 190, 382/195, 199, 203, 218, 219, 232, 237, 243, 244, 245, 246, 253

(56) References Cited

U.S. PATENT DOCUMENTS

| 4,410,916 A | * | 10/1983 | Pratt et al. ................. 382/181 |
| 4,606,069 A | * | 8/1986 | Johnsen ....................... 382/243 |
| 5,303,313 A | | 4/1994 | Mark et al. .................. 382/235 |
| 5,751,859 A | * | 5/1998 | Howard ....................... 382/238 |
| 5,815,721 A | * | 9/1998 | Benitez ....................... 717/160 |
| 6,016,361 A | * | 1/2000 | Hongu et al. ............... 382/209 |
| 6,122,402 A | * | 9/2000 | Arai et al. ................... 382/232 |
| 6,252,987 B1 | * | 6/2001 | Hashimoto et al. ......... 382/209 |
| 6,445,821 B1 | * | 9/2002 | Arai ........................... 382/209 |
| 6,526,172 B1 | * | 2/2003 | Arai ........................... 382/232 |

FOREIGN PATENT DOCUMENTS

| JP | 10-134192 | 5/1998 | ............. G06T/7/00 |
| JP | 10-134192 A | 5/1998 | |

* cited by examiner

Primary Examiner—Andrew W. Johns
Assistant Examiner—Amir Alavi
(74) Attorney, Agent, or Firm—Sughrue Mion, PLLC

(57) ABSTRACT

A pattern matching coding device for conducting coding of a unit pattern based on pattern matching with a library pattern, which device, as to a mark pattern determined to be matching, when the number of match error pixels of the pattern is not more than a prescribed value, codes, without coding the bit map, an identification ID of a matching bit map in a library and an identification flag indicating that the number of match error pixels is not more than the prescribed value.

25 Claims, 7 Drawing Sheets

|   | 1 | 2 | 3 |   |
|---|---|---|---|---|
| 4 | 5 | 6 | 7 | 8 |
| 9 | 10| x |   |   |

(EXTRACTION PATTERN)

UNMATCHING TEMPLATE

| 1 | 2 | 3 |
|---|---|---|
| 4 | x |   |

(EXTRACTION PATTERN)

(B) THE SAME POSITION AS THAT OF x

|   | 5 |    |
|---|---|----|
| 6 | 7 | 8  |
| 9 | 10| 11 |

(LIBRARY PATTERN)

MATCHING TEMPLATE

PATTERN MATCHING CODING DEVICE AND METHOD THEREOF

BACKGROUND OF THE INVENTION

1. Field of the Invention

The present invention relates to an image data compression device and, more particularly, to a pattern matching coding device for compressing binary image data by using pattern matching and a method thereof.

2. Description of the Related Art

One of the methods of inputting binary static image by means of a scanner and compressing its bit map data is disclosed in U.S. Pat. No. 5,303,313. According to this method, image data input by a scanner or the like is first compressed by run length coding etc. in advance and then a pattern is cut out therefrom. By the matching between the cut-out pattern and a registered template, generate template data and pattern position data. As a result, the input bit map data is compressed into data composed of a template code and a pattern position.

In order to improve a data compression rate of handwritten characters, unspecified-type characters, etc., proposed is an image data compression device provided with a temporary library allowing new registration or updating of bit map data to be compared with input bit map data according to input data.

Figure 8:
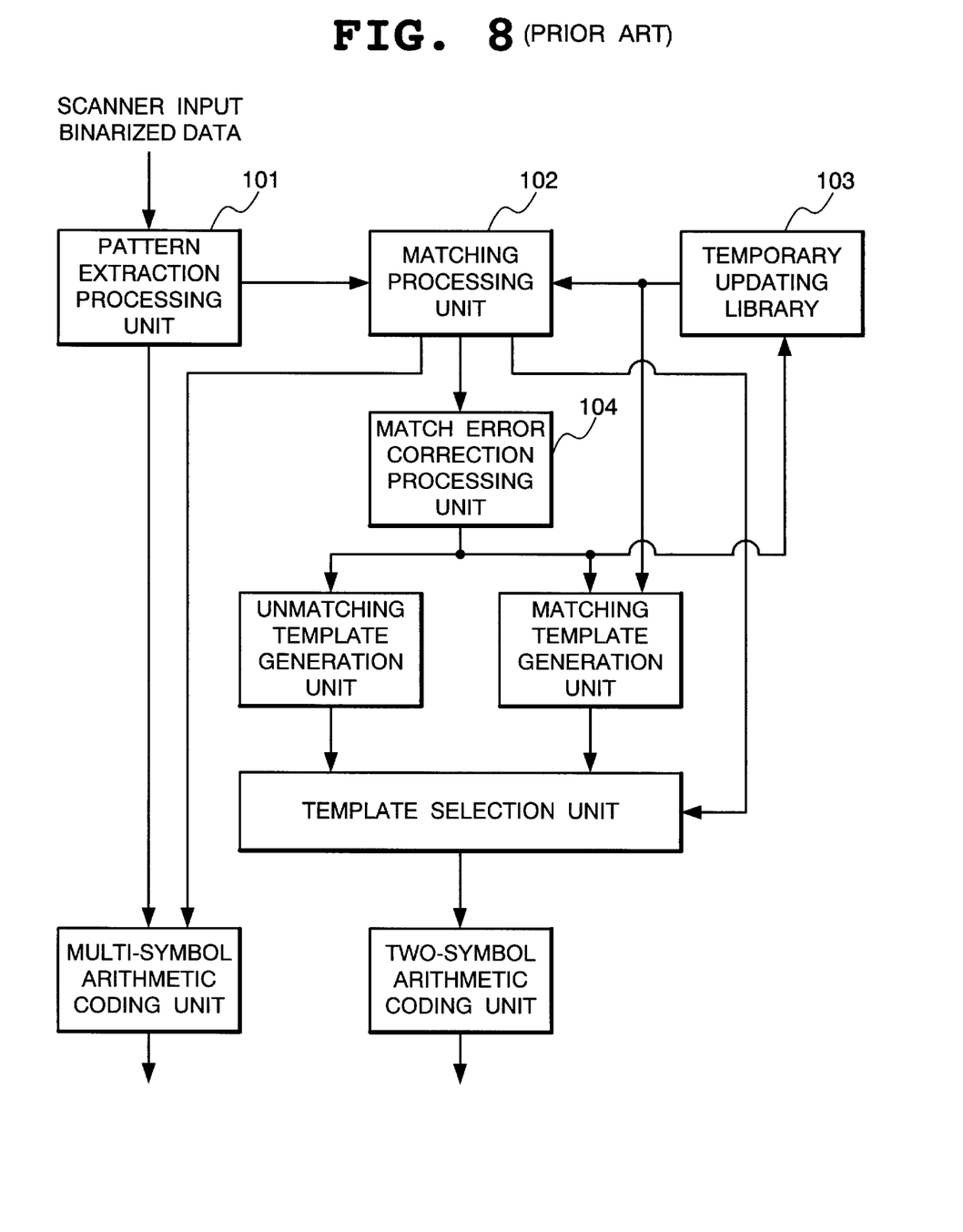
FIG. 8 is a block diagram showing one example of a conventional binary static image pattern matching coding device having a temporary updating library.

FIG. 8 is a block diagram showing one example of a conventional binary static image pattern matching coding device having a temporary updating library. In the figure, image data of a document original input through an original input scanner is subjected to binarization processing and smoothing processing for increasing a compression rate at the time of coding and improving visual image quality. A pattern extraction processing unit 101 extracts a pattern from the data having been subjected to the smoothing processing and outputs bit map data of a mark pattern to a matching processing unit 102. The matching processing unit 102 compares the mark pattern and a bit map pattern preserved in a temporary updating library 103. When a ratio of unmatching pixels to all the pixels is not more than a fixed value, the matching processing unit 102 determines that the patterns match and when the ratio exceeds the fixed value, determines that they unmatch.

When the determination is made at the matching processing unit 102 that the patterns match, output an identification ID of a bit map in the matching temporary updating library and registration data obtained at the time of the matching to a multi-symbol arithmetic coding unit and subjected to data compression. Bit map data of a mark pattern determined to match, after having its match error pixels subjected to inversion processing at a match correction processing unit 104, and bit map data of a mark pattern determined to unmatch, without being subjected to correction processing, are respectively registered as IDs at the temporary updating library 103. At the temporary updating library 103, a library bit map whose matching frequency is low is erased.

At the data compression of bit map data of a mark pattern, for an unmatching mark pattern, a prediction template pixel generated at an unmatching template generation unit is used and for a matching mark pattern, a prediction template pixel generated at a matching template generation unit is used.

The above-described conventional system has problems in image quality and optimization for improving a compression rate because pre-compression processing or smoothing processing is conducted prior to matching processing in order to improve a data compression rate and a temporary library is updated according to data whose match error has been corrected.

In order to solve these problems, Japanese Patent Laying-Open (Kokai) No. Heisei 10-134192 (U.S. Pat. No. 2,940,496) filed by the applicant of the present invention achieves drastic improvement in image quality by using a standard font bit map pattern for matching processing together with bit map data registered at a temporary updating library and proposes making new registration at the temporary updating library only when an input image pattern matches neither a temporary bit map pattern nor a standard font bit map pattern or only when the input image pattern matches only the temporary bit map pattern and is corrected, thereby attaining efficient use of the temporary updating library without wasteful registration. As a result, with a document original etc. printed by a font, a rate of a match with a mark pattern is increased to improve a compression rate. In the illustrated device, arithmetic coding which is well-known art widely used in a device of this kind is used for coding.

In the above-described system, while a compression rate is drastically improved by using a font bit map pattern, bit map data itself of a matching mark pattern is not compressed (no improvement in a compression rate is made in this part). Moreover, arithmetic coding used in pattern coding makes processing complicated and a processing rate lower. For realizing a higher-speed processing device, a component operable at a high-speed should be adopted, which increases costs.

SUMMARY OF THE INVENTION

An object of the present invention is to provide a pattern matching coding device realizing highly efficient compression without deteriorating image quality and a method thereof, and further provide a pattern matching coding device enabling coding by simple processing, that is, coding at low costs and at a high speed and a method thereof.

According to the first aspect of the invention, a device for extracting unit patterns from input binary image data and coding the unit patterns based on a result of sequentially conducted pattern matching with a library pattern, comprises first storage means for storing a first library pattern updatable based on the unit pattern, and pattern matching means for comparing the unit pattern with the first library pattern to conduct pattern matching processing, wherein as to a mark pattern determined to be matching, when the number of match error pixels of the pattern is not more than a prescribed value, without coding the bit map, an identification ID of a matching bit map in a library and an identification flag indicating that the number of match error pixels is not more than the prescribed value are coded.

In the preferred construction, the pattern matching coding device further comprises updating control means, the updating control means, when the unit pattern is determined to match the first library pattern by the pattern matching processing and is not the same as the first library pattern, newly registering the unit pattern at the first storage means.

In another preferred construction, the pattern matching coding device further comprises second storage means for storing a second library pattern of a font designated in advance, wherein the pattern matching means compares the unit pattern with the first library pattern and second library pattern to conduct pattern matching.

In another preferred construction, the updating control means, furthermore, when the unit pattern is determined to unmatch both the first library pattern and second library pattern by the pattern matching processing, newly registers the unit pattern at the first storage means.

In another preferred construction, in the matching processing, comparison between bit map data of the unit pattern and bit map data of the first library pattern and second library pattern is conducted to determine that the unit pattern is matching when a rate of the number of unmatching pixels of these bit maps is lower than a predetermined value and determine that the unit pattern is unmatching when the rate is higher than the value.

In another preferred construction, the updating control means, furthermore, when the unit pattern is determined to unmatch both the first library pattern and second library pattern by the pattern matching processing, newly registers the unit pattern at the first storage means, and in the matching processing, comparison between bit map data of the unit pattern and bit map data of the first library pattern and second library pattern is conducted to determine that the unit pattern is matching when a rate of the number of unmatching pixels of these bit maps is lower than a predetermined value and determine that the unit pattern is unmatching when the rate is higher than the value.

In another preferred construction, the pattern matching coding device further comprises font storage means for storing a plurality of kinds of fonts, font designating means for designating one of the fonts, and font development means for developing the designated font into a font bit map to generate the second library pattern.

In another preferred construction, the updating control means, when the unit pattern is determined to unmatch both the first library pattern and second library pattern by the pattern matching processing, newly registers the unit pattern at the first storage means, and which further comprises font storage means for storing a plurality of kinds of fonts, font designating means for designating one of the fonts, and font development means for developing the designated font into a font bit map to generate the second library pattern.

In another preferred construction, in the matching processing, comparison between bit map data of the unit pattern and bit map data of the first library pattern and second library pattern is conducted to determine that the unit pattern is matching when a rate of the number of unmatching pixels of these bit maps is lower than a predetermined value and determine that the unit pattern is unmatching when the rate is higher than the value, and which further comprises font storage means for storing a plurality of kinds of fonts, font designating means for designating one of the fonts, and font development means for developing the designated font into a font bit map to generate the second library pattern.

In another preferred construction, the pattern matching coding device further comprises font storage means for storing a plurality of kinds of fonts, font designating means for designating one of the fonts, and font development means for developing the designated font into a font bit map to generate the second library pattern, wherein the font designating means detects a font size and a font type from the unit pattern to designate the font.

In another preferred construction, the pattern matching coding device further comprises font storage means for storing a plurality of kinds of fonts, font designating means for designating one of the fonts, and font development means for developing the designated font into a font bit map to generate the second library pattern, wherein the font designating means is formed of input means for externally designating the font.

In another preferred construction, the device codes all the unit patterns within a predetermined coding range, classifies all the unit patterns in the range into types according to degrees of matching and sequentially for each type, successively codes and outputs a code indicative of the degree of matching and all of a unit pattern group of a type corresponding to the code.

In another preferred construction, the pattern matching coding device further comprises a Huffman coding unit, wherein an identification ID of bit map data in a matching library, the identification flag and registration data are coded and output by the Huffman coding unit.

According to the second aspect of the invention, a method of extracting unit patterns from input binary image data and coding the unit patterns based on a result of sequentially conducted pattern matching with a library pattern, comprising the steps of storing a first library pattern updatable based on the unit pattern, comparing the unit pattern with the first library pattern, and as to a mark pattern determined to be matching, when the number of match error pixels of the pattern is not more than a prescribed value, without coding the bit map, coding an identification ID of a matching bit map in a library and an identification flag indicating that the number of match error pixels is not more than the prescribed value.

In the preferred construction, the coding method further comprising the step of, when the unit pattern is determined to match the first library pattern, newly registering the unit pattern as the first library pattern.

According to the third aspect of the invention, a method of extracting unit patterns from input binary image data and coding the unit patterns based on a result of sequentially conducted pattern matching with a library pattern, comprising the steps of storing a first library pattern updatable based on the unit pattern, storing a second library pattern of a font designated in advance, comparing the unit pattern with the first library pattern and the second library pattern, when the unit pattern is determined to match the first library pattern and is not the same as the first library pattern, newly registering the unit pattern as the first library pattern, and as to a mark pattern determined to be matching, when the number of match error pixels of the pattern is not more than a prescribed value, without coding the bit map, coding an identification ID of a matching bit map in a matching library and an identification flag indicating that the number of match error pixels is not more than the prescribed value.

In the preferred construction, the coding method further comprising the step of, when the unit pattern is determined to match the first library pattern and is not the same as the first library pattern or when the unit pattern unmatches both the first library pattern and second library pattern, newly registering the unit pattern as the first library pattern.

According to another aspect of the invention, a method of extracting unit patterns from input binary image data and coding the unit patterns based on a result of sequentially conducted pattern matching with a library pattern, comprising the steps of storing a first library pattern updatable based on the unit pattern, storing a second library pattern of a font designated in advance, comparing the unit pattern in a predetermined coding range with the first library pattern and the second library pattern, when the unit pattern is determined to match the first library pattern and is not the same as the first library pattern, newly registering the unit pattern as the first library pattern, as to a mark pattern determined to be matching, when the number of match error pixels of the pattern is not more than a prescribed value, correlating an identification ID of a matching library and an identification ID of a bit map of the matching library, and classifying all the unit patterns in the range into types according to degrees of matching and sequentially for each type, without coding a bit map, successively coding a code indicative of the degree of matching and all of a unit pattern group of a type corresponding to the code.

In the preferred construction, the coding method further comprising the step of, when the unit pattern is determined to match the first library pattern and is not the same as the first library pattern or when the unit pattern unmatches both the first library pattern and second library pattern, newly registering the unit pattern as the first library pattern.

According to a further aspect of the invention, a computer readable memory which stores a coding program for extracting unit patterns from input binary image data and coding the unit patterns based on a result of sequentially conducted pattern matching with a library pattern, the coding program comprising the steps of storing a first library pattern updatable based on the unit pattern, comparing the unit pattern with the first library pattern, and as to a mark pattern determined to be matching, when the number of match error pixels of the pattern is not more than a prescribed value, without coding the bit map, coding an identification ID of a matching bit map in a library and an identification flag indicating that the number of match error pixels is not more than the prescribed value.

According to a further aspect of the invention, a computer readable memory which stores a coding program for extracting unit patterns from input binary image data and coding the unit patterns based on a result of sequentially conducted pattern matching with a library pattern, wherein the coding program comprises the steps of storing a first library pattern updatable based on the unit pattern, storing a second library pattern of a font designated in advance, comparing the unit pattern with the first library pattern and the second library pattern, when the unit pattern is determined to match the first library pattern and is not the same as the first library pattern, newly registering the unit pattern as the first library pattern, and as to a mark pattern determined to be matching, when the number of match error pixels of the pattern is not more than a prescribed value, without coding the bit map, coding an identification ID of a matching bit map in a library and an identification flag indicating that the number of match error pixels is not more than the prescribed value.

According to a further aspect of the invention, a computer readable memory which stores a coding program for extracting unit patterns from input binary image data and coding the unit patterns based on a result of sequentially conducted pattern matching with a library pattern, wherein the coding program comprises the steps of storing a first library pattern updatable based on the unit pattern, storing a second library pattern of a font designated in advance, comparing the unit pattern in a predetermined coding range with the first library pattern and the second library pattern, when the unit pattern is determined to match the first library pattern and is not the same as the first library pattern, newly registering the unit pattern as the first library pattern, as to a mark pattern determined to be matching, when the number of match error pixels of the pattern is not more than a prescribed value, correlating an identification ID of a matching library and an identification ID of a bit map of the matching library, and classifying all the unit patterns in the range into types according to degrees of matching and sequentially for each type, without coding the bit map, successively coding a code indicative of the degree of matching and all of a unit pattern group of a type corresponding to the code.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
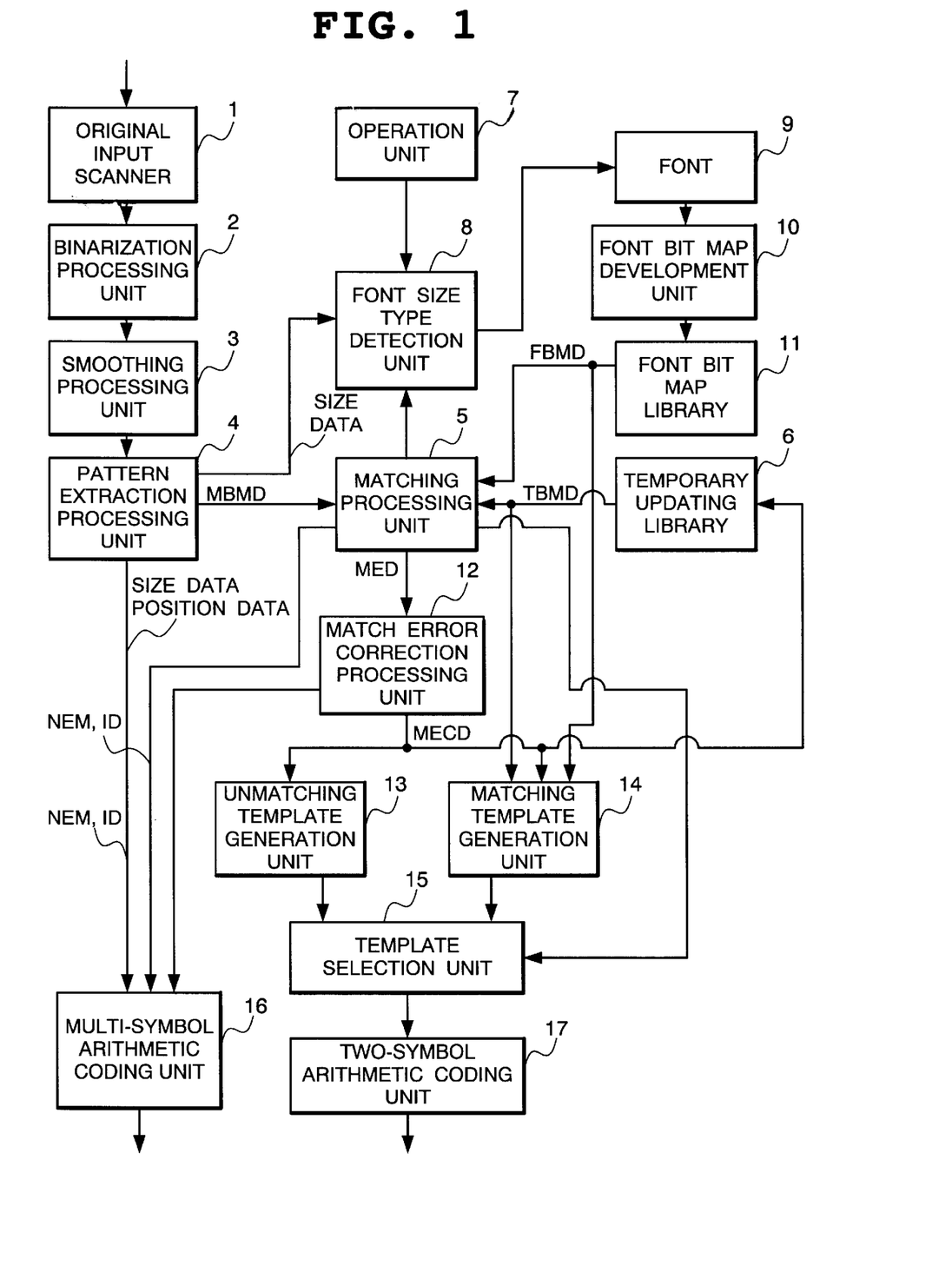
FIG. 1 is a block diagram showing a structure of a pattern matching coding device according to a first embodiment of the present invention.

FIG. 1 is a block diagram showing a pattern matching coding device according to one embodiment of the present invention. The illustrated device has a schematic structure substantially equal to that of the device disclosed as an embodiment in the above-mentioned Japanese Patent Laying-Open NO. 10-134192 and is assigned the same reference numerals. Among the components, those whose functions differ from those recited in Japanese Patent Laying-Open No. 10-134192 are a matching processing unit 5, a match error correction processing unit 12, etc. which will be detailed later.

In the following, description of the device shown in FIG. 1 will be made including the contents overlapping with those of Japanese Patent Laying-Open No. 10-134192. In the figure, read data of a document original input through an original input scanner 1 is converted into black and white binary image data at a binarization processing unit 2. The binary image data is applied to a smoothing processing unit 3, at which a notch and an isolated point pixel are removed to increase a compression rate at the time of coding and improve visual image quality. Data having been subjected to the smoothing processing is applied to a pattern extraction processing unit 4, at which cut-out processing on a character basis and processing of extracting a pattern from the cut-out unit are conducted which will be described later.

Mark pattern bit map data MBMD obtained by the pattern extraction processing is output to the matching processing unit 5, at which matching processing with temporary bit map data and font bit map data is conducted as will be described later. A temporary updating library 6, where temporary bit map data is stored, outputs a similar bit map data candidate to be compared to the matching processing unit 5 according to an instruction of the matching processing unit 5.

On the other hand, size data of the mark pattern obtained by the pattern extraction processing is output to a font size type detection unit 8, at which a font type of the input original is specified. In a case where a font type and a character size are known in advance, these character type data may be input to the font size (type) detection unit 8 by a user through an operation unit 7. The specified font type data is output to a font 9.

The font 9, where standard font data for use in general in a personal computer and a word-processor is accumulated, outputs a font according to the character type data applied from the font size type detection unit 8 to a font bit map development unit 10. The font bit map development unit 10 develops the font data into a bit map and registers its bit map data with an identification ID added thereto at a font bit map library 11.

Next, at the matching processing unit 5 according to the present embodiment, the mark pattern bit map data MBMD applied from the pattern extraction processing unit 4 is first compared with font bit map data FBMD applied from the font bit map library 11. When determination is made that they are unmatching, the MBMD is further compared with the temporary bit map data TBMD applied from the temporary updating library 6.

When determination is made that the data is matching in the course of the two comparisons, an identification ID of a matching bit map in the library and a signal indicative of the matching (coded as an identification flag indicating that the number of match error pixels is not more than a prescribed value) are sent to a multi-symbol arithmetic coding unit 16 and at this time, coded together with the size data and the position data which have been already described. In other words, without coding a bit map, an identification ID of the bit map in the library and an identification flag are coded.

On the other hand, when the above comparison results in determining that the data is unmatching (when an unmatching pixel exists), the unmatching pixel is output as match error data MED to the match error correction processing unit 12 and subjected to match error correction. When determination is made by the matching processing unit 5 that the data unmatches the data in both the libraries, no correction processing is conducted.

The error correction processing unit 12 updates (conducts additional registration) the temporary updating library 6 only when the determination is made that the data unmatches both of the data or only when the determination is made that although the data partly unmatches the temporary bit map data TBMD or the font bit map data FBMD, it is determined to be matching.

More specifically, when the determination is made that the data is unmatching both the data, the mark pattern bit map data MBMD is newly registered at the temporary updating library 6 without modification. In a case where the data MBMD matches the temporary bit map data TBMD or the font bit map data FBMD, when the bit map data of the mark pattern has an unmatching pixel, bit map data of the corrected mark pattern is newly registered as an ID at the temporary updating library 6.

The temporary updating library 6 is assumed to have a memory capacity large enough for accumulating all the patterns satisfying the above-described conditions while the present coding processing is executed or assumed to have a capacity of accumulating at least one page of bit map data and allow clearance of the temporary updating library for each page.

At data compression of bit map data of a mark pattern, among matching mark patterns, as to a mark pattern having none of match error pixels as described above, its identification flag NEM indicative of no error match and a bit map data identification ID of the matching library are output from the matching processing unit 5 to the multi-symbol arithmetic coding unit 16 and coded in pair with size data and position data of the corresponding mark pattern.

As to other matching mark patterns having match errors, conventional coding (data compression) accompanying bit map data is conducted. In other words, a prediction template pixel generated at a matching template generation unit 14 is used. Similarly, an unmatching mark pattern is coded using a prediction template pixel generated at the unmatching template generation unit 13.

A template selection unit 15 selects either a prediction template pixel for unmatching or that for matching according to a matching determination signal and the selected pixel is compressed at a two-symbol arithmetic coding unit 17. Size data and position data of the corresponding mark pattern is output through the multi-symbol arithmetic coding unit 16.

Operation of thus structured present embodiment will be described in more detail with reference to FIGS. 2 to 6. As to operation related to other processing than the coding, that is, pattern extraction processing, matching processing, match error correction processing, prediction template generation processing and the like are substantially the same as those of the device disclosed in Japanese Patent Laying-Open No. 10-134192 and have no large difference.

(Pattern Extraction Processing)

Figure 2:
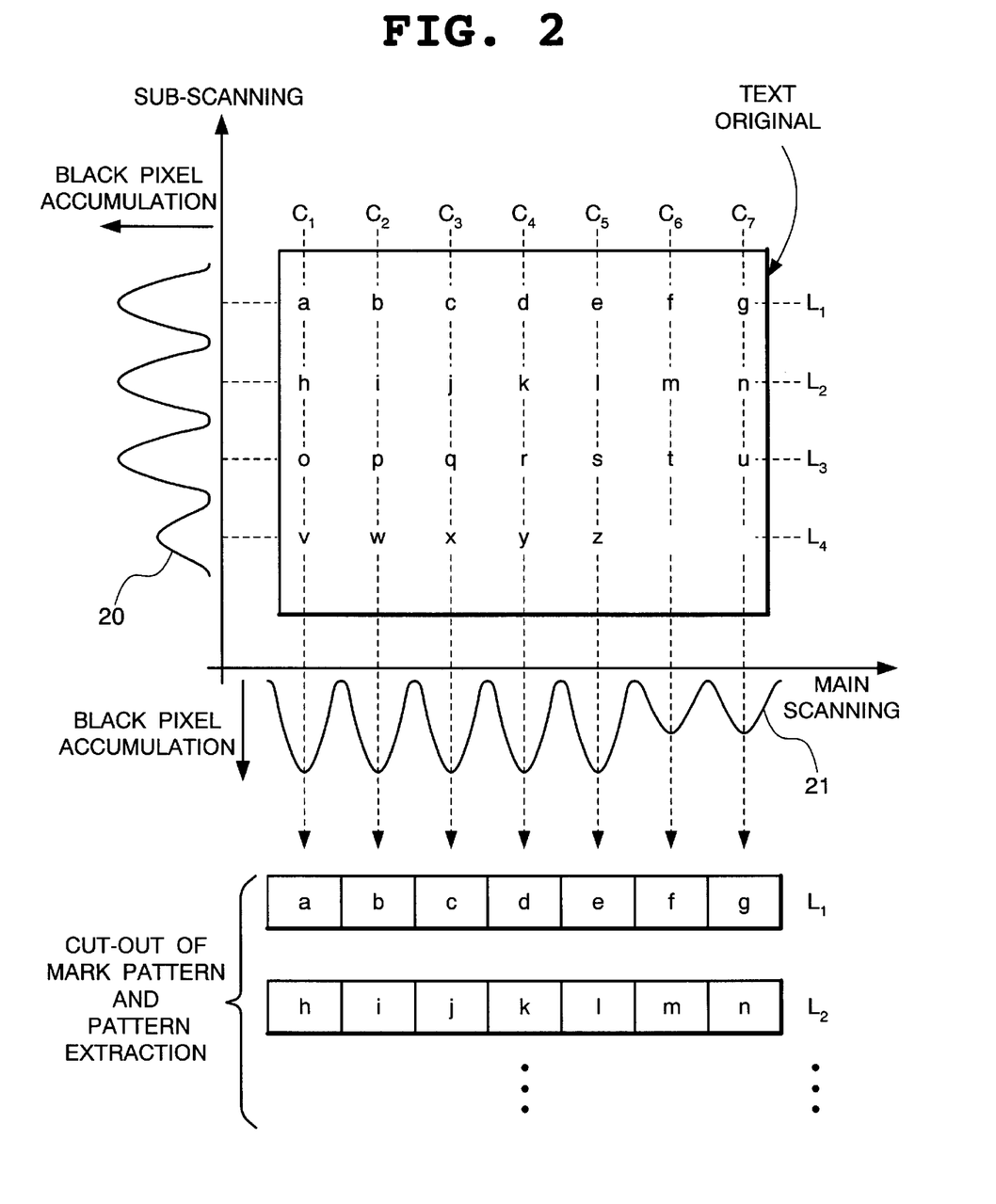
FIG. 2 is a schematic diagram for use in explaining a project and divide method in which cut-out on a character basis is conducted at a pattern extraction processing unit 4.

FIG. 2 is a schematic diagram for use in explaining a project and divide method in which cut-out on a character basis is conducted at the pattern extraction processing unit 4. It is assumed here that a text original in which characters are recited in four rows (L1–L4) and seven columns (C1–C7) is scanned, so that binary image data is input to the pattern extraction processing unit 4. The pattern extraction processing unit 4 cuts out each character and extracts a pattern by using the following project and divide method and boundary trace method together.

As shown in FIG. 2, in the project and divide method, a mark pattern is cut out by counting black pixels in both a main scanning direction and a sub-scanning direction to measure an accumulation distribution thereof. First, count a black pixel on each main scanning line. At this time, on a line in which characters align, the number of black pixels is large and between the lines black pixels barely exist. Accordingly, an accumulation waveform 20 according to the number of black pixels is obtained in the sub-scanning direction and detection of an interval between peaks of the waveform enables separation on a row basis. Executing similar counting of the number of black pixels also in the sub-scanning direction obtains an accumulation waveform 21 according to the number of black pixels in the main scanning direction and detection of an interval between peaks of the waveform enables separation on a column basis. Such counting of the number of black pixels enables cut-out on a character basis in each row.

Figure 3:
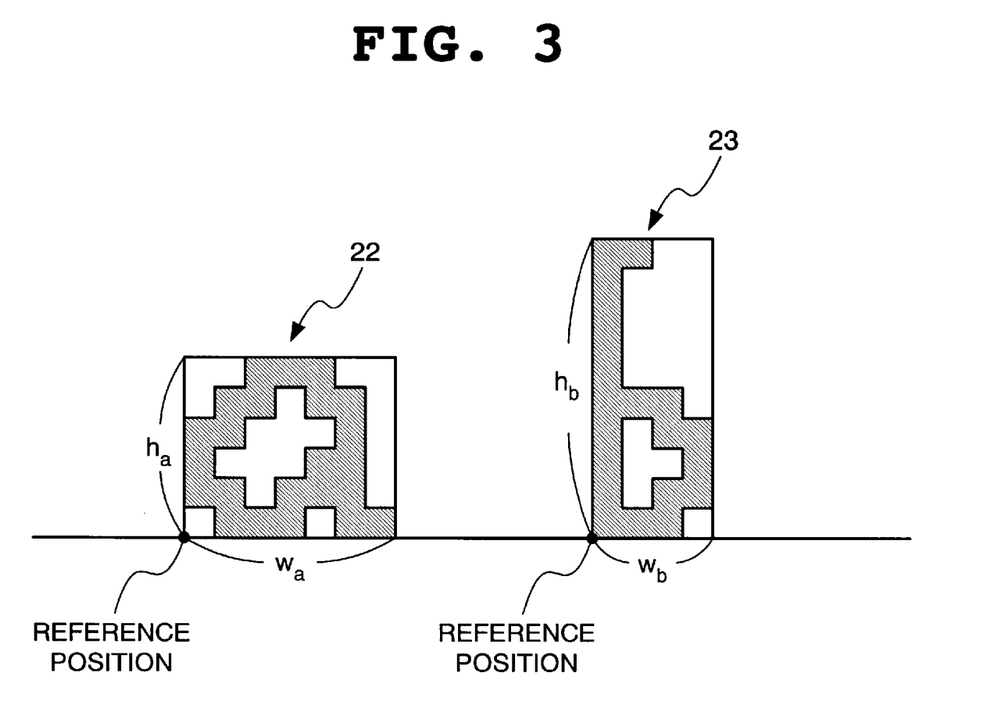
FIG. 3 is a schematic diagram showing a character pattern for use in explaining a boundary trace method in which cut-out on a character basis is conducted at the pattern extraction processing unit 4.

FIG. 3 is a schematic diagram showing a character pattern for use in explaining the boundary trace method in which cut-out on a character basis is conducted at the pattern extraction processing unit 4. By the boundary trace method, a set of linked black pixels of binary image data is detected to consider a minimum rectangular bit map covering the linkage of the black pixels as one mark pattern. FIG. 3 shows marked alphabets "a" and "b" as an example. As to the extracted mark patterns, bit map data and size data (height h and width w of the rectangles) of their rectangles 22 and 23 and position data of the marks on the document original are generated. In the method employing only the boundary trace, since such a character as "i" or "j" which has some black pixels not linked, its mark pattern will be divided into two. In order to increase precision in character cut out, therefore, use of the above-described project and divide method together with the boundary trace method is effective.

The size data and the position data of the mark pattern generated at the pattern extraction processing unit 4 is applied to the multi-symbol arithmetic coding unit 16 and subjected to data compression together with other data. In addition, the size data is output to the font size type detection unit 8, in which analysis and determination of a font type best matching the font size is made. Data output from the font size type detection unit 8 to the font 9 is character type definition data such as, font type: gothic and character size: 10 points.

(Matching Processing)

The bit map data of the mark pattern generated at the pattern extraction processing unit 4 is applied to the matching processing unit 5, where the mark pattern and bit map pattern groups preserved in the font bit map library 11 and the temporary updating library 6 are compared.

Figure 4:
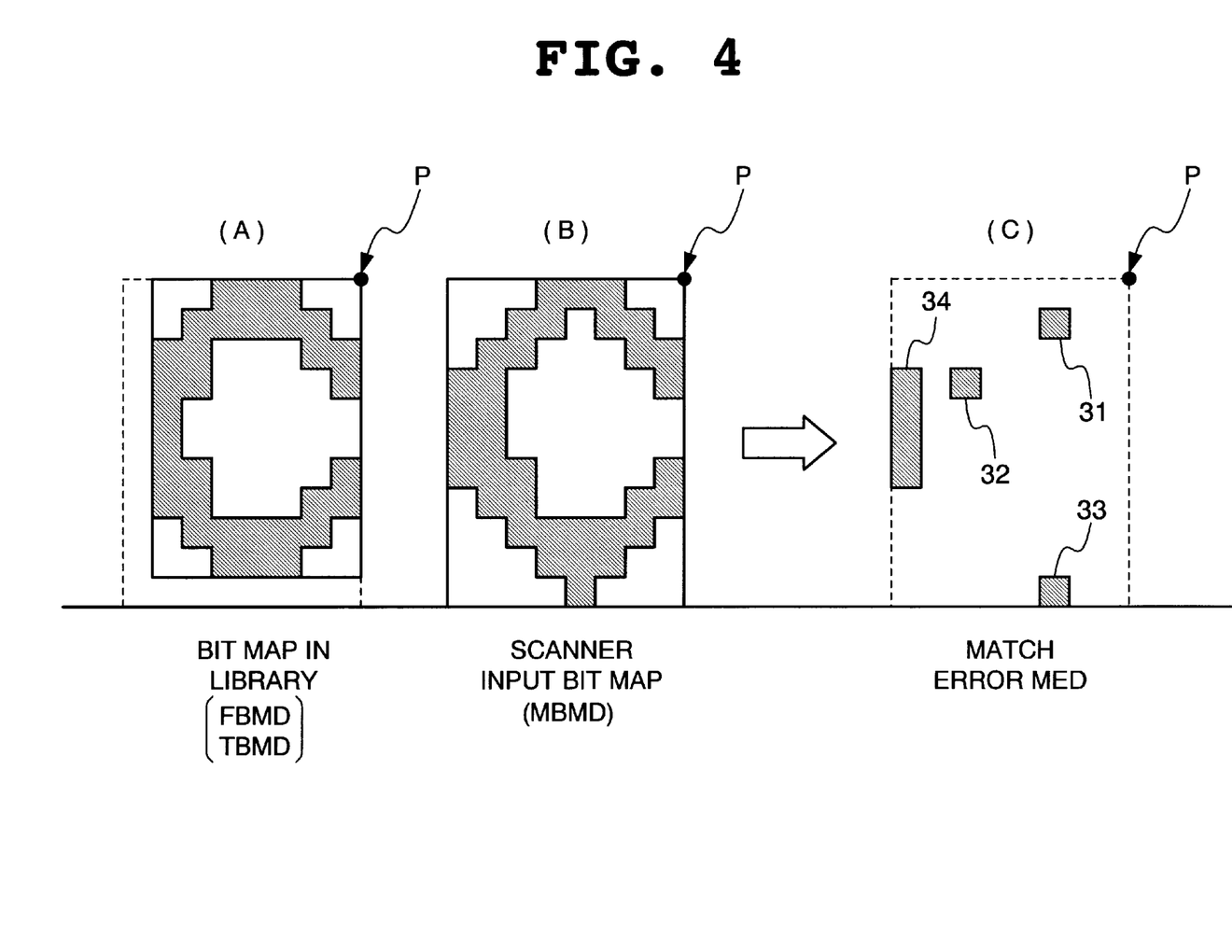
FIG. 4 is a schematic diagram showing one example of a bit map pattern for use in explaining matching processing in the present embodiment.

FIG. 4 is a schematic diagram showing one example of a bit map pattern for use in explaining the matching processing in the present embodiment. Shown here is matching processing related to a mark pattern corresponding to the alphabet "c". Although when mark pattern bit map data MBMD shown in FIG. 4(B) which is input by a scanner is applied, the matching processing unit 5 compares the data with bit map data FBMD and TBMD preserved in the font bit map library 11 and the temporary updating library 6, the unit in practice does not compare the data with all the bit maps preserved in these libraries but narrows down candidates. The unit 5, for example, selects a rectangular bit map group in the library whose mark pattern size is relatively similar as a candidate for matching processing. With a mark pattern size as a condition of narrowing-down, the alphabet "c" stored in the font bit map library 11 and the temporary updating library 6 can be a candidate for matching because the size of its rectangle is relatively similar.

Matching is conducted with the maps overlapped with each other so as to be registered at the four corners of a rectangle and a position at which the number of match errors is the smallest among them is selected. Here, since the number of match error pixels is the smallest when the maps are registered at the upper right corner P, match errors are obtained with the maps registered at the upper right corner. Match error is obtained between the mark pattern bit map data and thus read bit map data as a candidate in the library, and bit map data having the least match error data is determined as a matching library pattern.

Determination on match and unmatch is made according to a ratio of the smallest number of match error pixels to the number of all the pixels of a mark pattern. In the example shown in FIG. 4, for example, from among candidate bit maps, "c" having the smallest number of match errors is ultimately selected and when the number of match error pixels is seven in the total number, 88, of pixels of the mark pattern, the unmatch rate will be approximately 8%. If it is assumed that when the unmatch rate is not more than 10%, match is determined, the bit map MBMD input by a scanner is determined to match the bit map "c", in the library.

More specifically, first, matching processing is executed between the bit map MBMD of the mark pattern and the bit map FMBD preserved in the font bit map library 11. When determination of unmatch is made in this processing, that is, when the number of match error pixels is large, the mark pattern is determined to be a mark pattern other than standard font (e.g. handwritten character, graphics) and subsequently matching processing with the bit map TMBD preserved in the temporary updating library 6 is executed. In these series of matching processing, bit maps of a match error pattern having the smallest number of match errors and the mark pattern are output to the match error correction processing 12.

Among mark patterns determined to be matching, as to a pattern whose number of match error pixels is zero, that is, when a mark pattern whose bit map completely coincides with a bit map in the font bit map library 11 or the temporary updating library 6, an identification ID of a bit map in the matching font bit map library 11 or temporary updating library 6, an identification flag indicating that the match error is zero and registration data of a rectangle obtained at the time of matching are output to the multi-symbol arithmetic coding unit 16 to conduct data compression. On the other hand, a bit map whose match error pixel is not zero among the mark patterns determined to be matching and the match error data MED are output to the match correction processing unit 12 and subjected to match correction processing which will be described in the following.

(Match Error Correction)

Assuming that match error pixels 31 to 34 are detected by the above-described matching processing as shown in FIG. 4(C), the match error correction processing unit 12 executes inversion processing with respect to these match error pixels. In this case, it is possible not only to execute simple inversion but also to add conditional processing with respect to match error correction processing. In a case shown in FIG. 4(C), for example, mark pattern bit map inversion processing is conducted with respect to the isolated match error pixels 31 to 33, while no inversion processing is conducted with respect to the match error pixel group 34 including two or more continuous pixels. In addition, as to a mark pattern determined to match neither a bit map of the font bit map library 11 nor a bit map of the temporary updating library 6 by the matching processing unit 5, the match error correction processing unit 12 executes no correction processing in particular.

As to a mark pattern having no match error pixel after the correction processing at the match error correction processing unit 12, an identification ID of a bit map in the matching font bit map library 11 or temporary updating library 6, the identification flag indicating that the number of match errors is zero and registration data of a rectangle obtained at the time of matching are output to the multi-symbol arithmetic coding unit 16 and subjected to data compression. A mark pattern which is determined to be matching and whose number of match error pixels is not zero and a mark pattern determined to be unmatching will be compressed by the two-symbol arithmetic coding unit 17 which will be described later.

The bit map data of the mark pattern output from the match error correction processing unit 12 is newly registered as an ID at the temporary updating library 6 only when the data is determined to be unmatching as described above or only when it is determined to be matching although it does not partly coincide with the bit map data in the temporary updating library 6 or the font bit map library 11 and has several match error pixels.

(Generation of Prediction Template)

In data compression of map data of a mark pattern bit, for an unmatching mark pattern, a prediction template pixel generated by an unmatching template generation unit 13 is used, while for a matching mark pattern, a prediction template generated by the matching template generation unit 14 is used.

Figure 5:
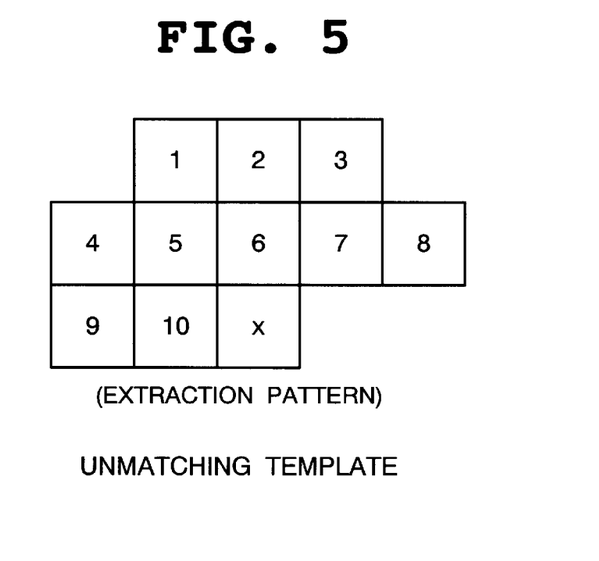
FIG. 5 is a schematic diagram showing one example of an unmatching template.

FIG. 5 is a schematic diagram showing one example of an unmatching template, in which compression is conducted using ten pixels existing around a pixel x to be coded as prediction pixels. In the figure, an extraction pattern represents a bit map of a mark pattern.

Figure 6:
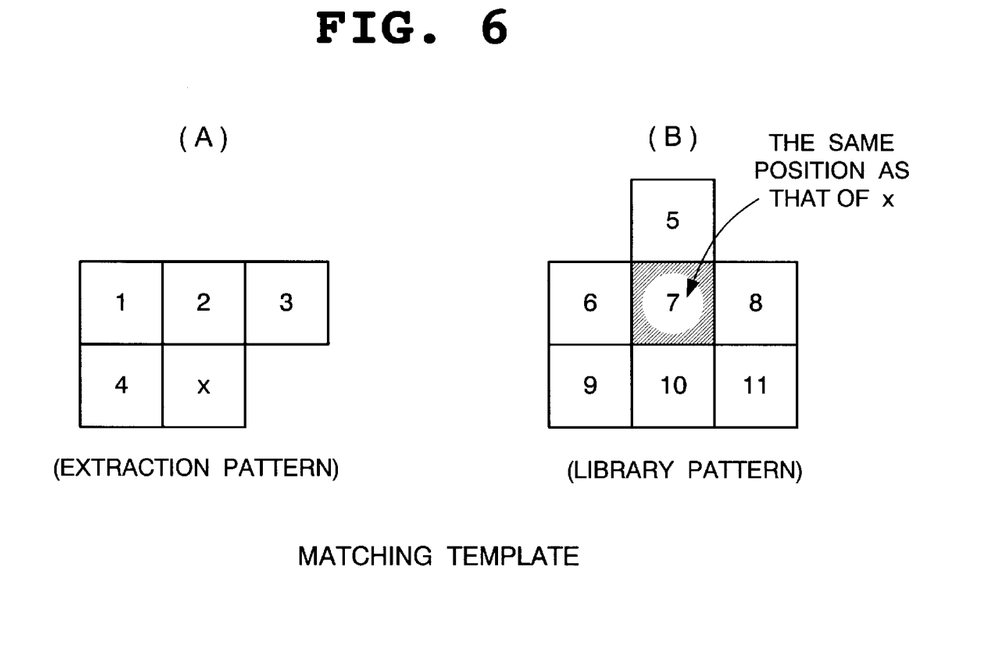
FIG. 6 is a schematic diagram illustrating one example of a matching template, FIG. 6(A) showing four pixels around a pixel x to be coded and FIG. 6(B) showing seven pixels of bit map data in a matching library.

FIG. 6 is a schematic diagram showing one example of a matching template, in which compression is conducted using four pixels existing around the pixel x to be coded shown in FIG. 6(A) and using bit map data seven pixels in the matching library shown in FIG. 6(B). In the figure, an extraction pattern represents a bit map of a mark pattern, while a library pattern represents a bit map of a matching library. In this case, a pixel positioned at No. 7 of the library pattern is located at the same position as that of the pixel x to be coded.

The prediction template pixels generated by the unmatching template generation unit 13 and the matching template generation unit 14 and the pixel x to be coded are output to the template selection unit 15, which unit selects either of the templates to be used for compression based on determination results by the matching processing unit 5. The selected template pixel and the pixel x to be coded are output to the two-symbol arithmetic coding unit 17 to execute compression of bit map data on a mark pattern basis.

(Coding)

Next, function of the multi-symbol arithmetic coding unit 16 will be described. With respect to a mark pattern determined to be matching and having no match error pixel, the multi-symbol arithmetic coding unit 16 compresses size data and position data of the mark pattern, an identification ID of a bit map in a matching library, the identification flag indicating that the number of match error pixels is zero and registration data of a rectangle obtained when matching is conducted.

On the other hand, as to a mark pattern having a match error pixel, the multi-symbol arithmetic coding unit 16 will compress size data and position data of the mark pattern, an identification ID of a bit map in a matching library, the identification flag indicating that the number of match error pixels is not zero and registration data of a rectangle obtained when matching is conducted. The two-symbol arithmetic coding unit compresses the corresponding bit map data and complements the same.

As to a mark pattern determined to be unmatching, the unit 16 compresses size data and position data of the mark pattern. The two-symbol arithmetic coding unit compresses the corresponding bit map data and complements the same.

In the above-described device of the present embodiment, among mark patterns determined to be matching, with respect to a pattern whose number of match error pixels is zero and a mark pattern whose number of match error pixels attains zero after error correction, only an identification ID of its bit map data in the font bit map library or the temporary updating library is coded and the bit map data itself will not be coded.

More specifically, as to a mark pattern determined to be matching, naturally its identification ID should be coded. The present invention realizes the coding by coding the identification ID and not compressed data of its bit map but only one bit of a flag for identifying whether a pattern has no match error. Therefore, as compared to conventional devices, the device of the present invention drastically improves compression efficiency.

In the above-described embodiment, arithmetic coding is used for compression. In conventional pattern coding, in general, at the time of coding a pattern determined to be matching, arithmetic coding is conducted with reference to a matching library. Coding, however, is not limited thereto. Consider a case where Huffman coding is singly used in place of arithmetic coding. Even for a pattern determined to be matching, a bit map itself of the mark pattern is coded without referring to a pattern in a library, resulting in failing to conduct effective compression of a matching pattern and accordingly having no advantage. The present invention attains improvement in this respect.

Assume here that a match error bit map having relatively continuous white runs is coded by Huffman coding, effective compression can be realized even with respect to a pattern determined to be matching. As a result, practical-level compression effect can be obtained for all data by compression using not arithmetic coding but Huffman coding such as MH/MR/MMR as in the Recommendation related to facsimile devices. Such arrangement realizes with ease a device having simpler structure and having compression effects (high speed) more sufficient for practical use as software than those of a device using arithmetic coding.

Figure 7:
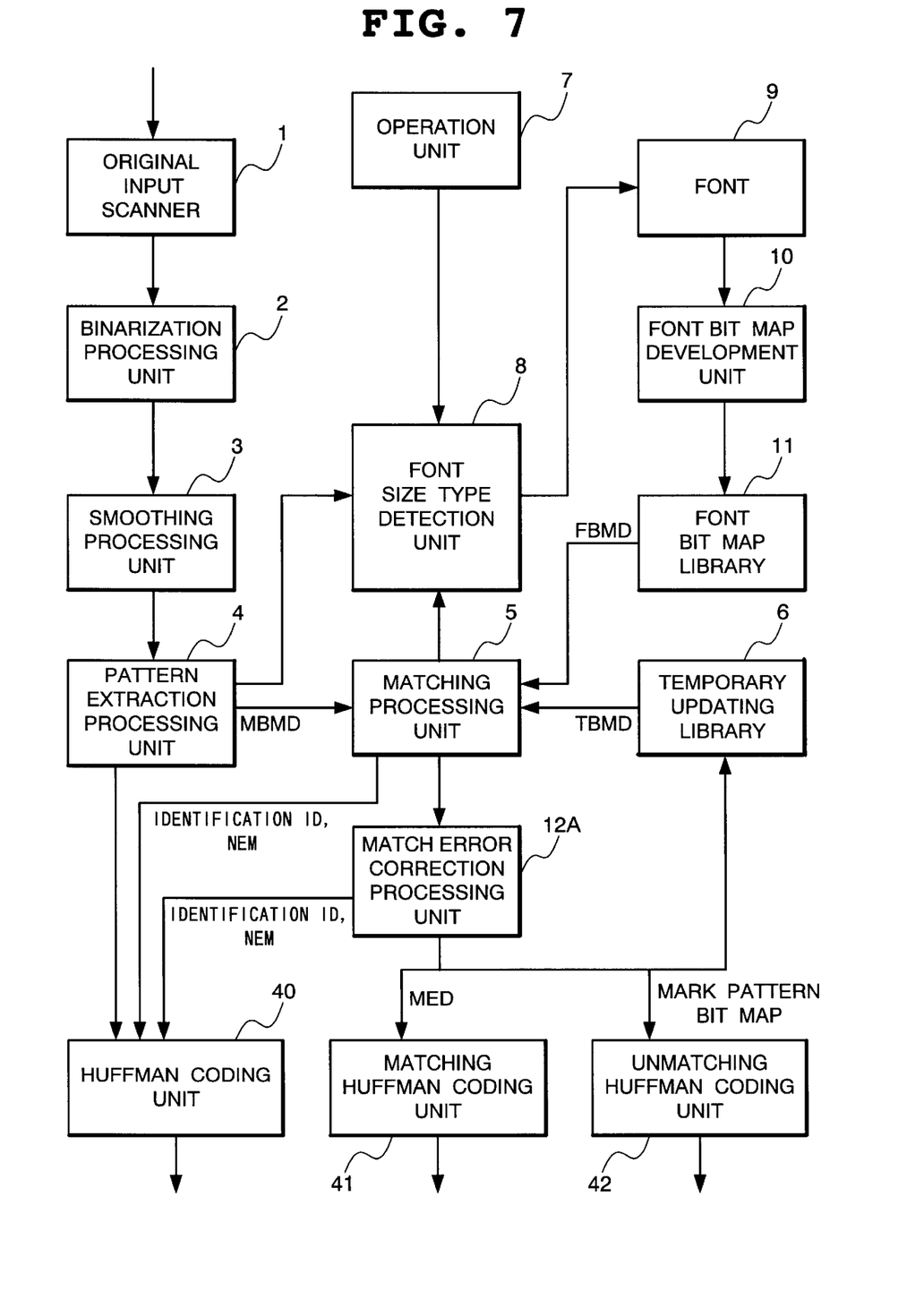
FIG. 7 is a block diagram showing a structure of a pattern matching coding device according to a second embodiment of the present invention.

Next, description will be made of another embodiment of the present invention based on the above-described technical idea. Block diagram of a structure of a second embodiment of the present invention is shown in FIG. 7. In the device illustrated in the diagram, an original input scanner 1, a binarization processing unit 2, a smoothing processing unit 3, a pattern extraction processing unit 4, a matching processing unit 5, a temporary updating library 6, an operation unit 7, a font size detection unit 8, a font 9, a font bit map development unit 10 and a font bit map library 11 have substantially the same structure and the same operation of their counterparts in the above-described first embodiment.

In addition to the above-described respective components, the device includes a match error correction processing unit 12A, a Huffman coding unit 40, a matching Huffman coding unit 41 and an unmatching Huffman coding unit 42. These components will be described in the following.

Of mark patterns determined to be matching, as to a pattern having a match error pixel even after correction in the error correction processing unit 12A, error bit map data MED is output to the matching Huffman coding unit 41 and furthermore, an identification ID of matching bit map data in the font bit map library 11 or the temporary updating library 6, an identification flag NEM indicating that it is not no error match and registration data of a rectangle obtained when matching is conducted are output to the Huffman coding unit 40.

On the other hand, as to a mark pattern determined to be unmatching, bit map data itself of the mark pattern is output to the unmatching Huffman coding unit 42. Moreover, as to a mark pattern whose number of match error pixels attains zero after the correction, an identification flag indicative of no error match and an identification ID of matching bit map data in the font bit map library 11 or the temporary updating library 6 are output to the Huffman coding unit 40 and compressed. In addition, size data and position data of all the mark patterns is output to the Huffman coding unit 40 and compressed.

At the matching Huffman coding unit 41, error bit map data is compressed, while at the unmatching Huffman coding unit 42, bit map data of a mark pattern is compressed. Huffman coding itself is well-known art widely used in various kinds of devices and description thereof will not be made here.

Since the present embodiment employs not arithmetic coding but Huffman coding, it has an advantage of realizing a data coding unit relatively easy although compression efficiency is liable to be decreased. Therefore, also into this embodiment, the above-described process of coding only an identification ID for the compression of a no error match mark pattern according to the present invention is introduced and furthermore, for the compression of a matching mark pattern having an error, Huffman coding is employed for a match error bit map having relatively many white runs. As a result, it is expected that reduction in compression performance in practice can be suppressed to a level causing no problem in practical use.

As described in the foregoing, according to the present embodiment, high-speediness enough for practical use can be realized without such enormous reduction of compression performance as hurts practicality and a demand for a high speed and a simple structure can be satisfied in a low-end coding processing device etc. which requires facility and a high processing speed.

In the first and the second embodiments, similarly to the above-described device disclosed in Japanese Patent Laying-Open No. 10-134192, before reading an original by the original input scanner 1, a font type at the time when the document original is generated and a font size are input through the operation unit 9, thereby outputting its font size and type data to the font type detection unit 8. Execution of this operation increases a possibility that bit map data of mark patterns generated at the font bit map library 11 and the pattern extraction processing unit 4 will match each other, thereby achieving improvement of image quality and further increase of data compression efficiency.

Although in the foregoing description of the embodiments, the structure using a font pattern is exemplified by which more effects of the present invention are produced, it is obvious that the present invention is applicable to a pattern matching coding device including only a temporary updating library and using none of font patterns to obtain the same effects produced by the structure of the present invention.

In addition, although in each of the above-described embodiments, extracted mark patterns are individually coded one by one, improvement is possible also in this respect. In the following, the present invention aiming at the improvement in this respect will be described.

According to the present invention, at the coding and outputting of the pattern matching coding device, the device codes all unit patterns within a predetermined coding range, classifies all the unit patterns within the range into types according to the degrees of matching and sequentially for each type, successively codes and outputs a code indicative of the degree of matching and all of a unit pattern group of a type corresponding to the code.

For example, classify unit patterns of one whole page into three types, an unmatch pattern group, a no error match pattern group and a normal match pattern group and then code each pattern group at a time. Structure of the device itself may be substantially the same as that of the foregoing described device and required is only a change of control of a coding-related part and a minor change accompanying the same.

This pattern matching coding device, similarly to the already described devices of the embodiments, extracts unit patterns from input binary image data and sequentially codes the unit patterns based on a result of pattern matching with a library pattern.

Similarly to the above-described examples, coding includes a step of storing a first library pattern updatable based on a unit pattern, a step of storing a second library pattern of a font designated in advance, a step of comparing the unit pattern within a predetermined coding range with the first library pattern and the second library pattern and a step of newly registering the unit pattern as a first library pattern when the unit pattern is determined to match the first library pattern and the pattern is not the same as the first library pattern or when the unit pattern is determined to match with neither the first library pattern nor the second library pattern. So far described process is the same as that already described.

Moreover, as to a mark pattern determined to be matching, when the number of match error pixels is not more than a prescribed value, correlate an identification ID of a matching library and an identification ID of a bit map in the matching library with each other.

Then, classify all unit patterns in the range into types according to degrees of matching and sequentially for each kind, successively code and output a code indicative of a degree of matching and all of a unit pattern group of a type corresponding to the code.

Since the above-described device and method, an identification flag indicating whether the number of error images is zero or not and an identification flag indicating whether a pattern is matching or not appear only once at the head of each pattern group, compression efficiency is further improved. Determination of a range is arbitrary and is possible not only on a page basis but also on a basis of a band containing N (N≧1) lines and on a basis of N (N≧1) pages.

In the pattern matching coding device according to the present embodiment, each of the above-described functions is realized not only as hardware but also by loading a coding program having each function into a memory of a computer processing device. The coding program is stored in a recording medium (reference number) such as a magnetic disk or a semiconductor memory. Then, the coding program will be loaded from the recording medium into the computer processing device to control operation of the computer processing device, thereby realizing each of the above-described functions.

As described in the foregoing, according to the present invention, since a pattern matching coding device which executes coding of a unit pattern based on a result of pattern matching with a library pattern is structured such that as to a mark pattern determined to be matching, when the number of match error pixels is not more than a prescribed value, an identification ID of a matching bit map in the library and an identification flag indicating that the number of match error pixels is not more than the prescribed value are coded (without coding a bit map), a compression rate of image data can be more increased than that obtained by conventional devices.

Moreover, further providing a Huffman coding unit to use Huffman coding without using arithmetic coding whose processing is complicated enables provision of a device which realizes efficient and high-speed coding by simple structure.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A device for extracting unit patterns from input binary image data and coding said unit patterns based on a result of sequentially conducted pattern matching with a library pattern, comprising:

first storage means for storing a first library pattern updatable based on said unit pattern; and pattern matching means for comparing said unit pattern with said first library pattern to conduct pattern matching processing; wherein as to a mark pattern determined to be matching, when the number of match error pixels of the pattern is not more than a prescribed value, without coding the bit map, an identification ID of a matching bit map in a library and an identification flag indicating that the number of match error pixels is not more than the prescribed value are coded.

2. The pattern matching coding device as set forth in claim 1, further comprising updating control means, said updating control means, when said unit pattern is determined to match said first library pattern by said pattern matching processing and is not the same as said first library pattern, newly registering said unit pattern at said first storage means.

3. The pattern matching coding device as set forth in claim 1, further comprising second storage means for storing a second library pattern of a font designated in advance, wherein said pattern matching means compares said unit pattern with said first library pattern and second library pattern to conduct pattern matching.

4. The pattern matching coding device as set forth in claim 3, wherein said updating control means, furthermore, when said unit pattern is determined to unmatch both said first library pattern and second library pattern by said pattern matching processing, newly registers said unit pattern at said first storage means.

5. The pattern matching coding device as set forth in claim 3, wherein in said matching processing, comparison between bit map data of said unit pattern and bit map data of said first library pattern and second library pattern is conducted to determine that the unit pattern is matching when a rate of the number of unmatching pixels of these bit maps is lower than a predetermined value and determine that the unit pattern is unmatching when the rate is higher than the value.

6. The pattern matching coding device as set forth in claim 3, wherein said updating control means, furthermore, when said unit pattern is determined to unmatch both said first library pattern and second library pattern by said pattern matching processing, newly registers said unit pattern at said first storage means, and in said matching processing, comparison between bit map data of said unit pattern and bit map data of said first library pattern and second library pattern is conducted to determine that the unit pattern is matching when a rate of the number of unmatching pixels of these bit maps is lower than a predetermined value and determine that the unit pattern is unmatching when the rate is higher than the value.

7. The pattern matching coding device as set forth in claim 3, further comprising:
font storage means for storing a plurality of kinds of fonts, font designating means for designating one of said fonts, and
font development means for developing said designated font into a font bit map to generate said second library pattern.

8. The pattern matching coding device as set forth in claim 3, wherein
said updating control means, when said unit pattern is determined to unmatch both said first library pattern and second library pattern by said pattern matching processing, newly registers said unit pattern at said first storage means, and which further comprises
font storage means for storing a plurality of kinds of fonts, font designating means for designating one of said fonts, and
font development means for developing said designated font into a font bit map to generate said second library pattern.

9. The pattern matching coding device as set forth in claim 3, wherein
in said matching processing, comparison between bit map data of said unit pattern and bit map data of said first library pattern and second library pattern is conducted to determine that the unit pattern is matching when a rate of the number of unmatching pixels of these bit maps is lower than a predetermined value and determine that the unit pattern is unmatching when the rate is higher than the value, and which further comprises
font storage means for storing a plurality of kinds of fonts, font designating means for designating one of said fonts, and
font development means for developing said designated font into a font bit map to generate said second library pattern.

10. The pattern matching coding device as set forth in claim 3, further comprising:
font storage means for storing a plurality of kinds of fonts, font designating means for designating one of said fonts, and
font development means for developing said designated font into a font bit map to generate said second library pattern, wherein
said font designating means detects a font size and a font type from said unit pattern to designate said font.

11. The pattern matching coding device as set forth in claim 3, further comprising:
font storage means for storing a plurality of kinds of fonts, font designating means for designating one of said fonts, and
font development means for developing said designated font into a font bit map to generate said second library pattern, wherein
said font designating means is formed of input means for externally designating said font.

12. The pattern matching coding device as set forth in claim 1, wherein said device codes all said unit patterns within a predetermined coding range, classifies all the unit patterns in said range into types according to degrees of matching and sequentially for each type, successively codes and outputs a code indicative of the degree of matching and all of a unit pattern group of a type corresponding to the code.

13. The pattern matching coding device as set forth in claim 1, further comprising
a Huffman coding unit, wherein
an identification ID of bit map data in a matching library, said identification flag and registration data are coded and output by the Huffman coding unit.

14. A method of extracting unit patterns from input binary image data and coding said unit patterns based on a result of sequentially conducted pattern matching with a library pattern, comprising the steps of:
storing a first library pattern updatable based on said unit pattern;
comparing said unit pattern with the first library pattern; and
as to a mark pattern determined to be matching, when the number of match error pixels of the pattern is not more than a prescribed value, without coding the bit map, coding an identification ID of a matching bit map in a library and an identification flag indicating that the number of match error pixels is not more than the prescribed value.

15. The coding method as set forth in claim 14, further comprising the step of,
when said unit pattern is determined to match said first library pattern, newly registering said unit pattern as the first library pattern.

16. A method of extracting unit patterns from input binary image data and coding said unit patterns based on a result of sequentially conducted pattern matching with a library pattern, comprising the steps of:
storing a first library pattern updatable based on said unit pattern,
storing a second library pattern of a font designated in advance,
comparing said unit pattern with the first library pattern and the second library pattern,
when said unit pattern is determined to match said first library pattern and is not the same as said first library pattern, newly registering said unit pattern as the first library pattern, and
as to a mark pattern determined to be matching, when the number of match error pixels of the pattern is not more than a prescribed value, without coding the bit map, coding an identification ID of a matching bit map in a matching library and an identification flag indicating that the number of match error pixels is not more than the prescribed value.

17. The coding method as set forth in claim 16, further comprising the step of,
when said unit pattern is determined to match said first library pattern and is not the same as said first library pattern or when said unit pattern unmatches both said first library pattern and second library pattern, newly registering said unit pattern as the first library pattern.

18. A method of extracting unit patterns from input binary image data and coding said unit patterns based on a result of sequentially conducted pattern matching with a library pattern, comprising the steps of:

storing a first library pattern updatable based on said unit pattern, storing a second library pattern of a font designated in advance, comparing said unit pattern in a predetermined coding range with the first library pattern and the second library pattern, when said unit pattern is determined to match said first library pattern and is not the same as said first library pattern, newly registering said unit pattern as the first library pattern, as to a mark pattern determined to be matching, when the number of match error pixels of the pattern is not more than a prescribed value, correlating an identification ID of a matching library and an identification ID of a bit map of the matching library, and classifying all the unit patterns in said range into types according to degrees of matching and sequentially for each type, without coding a bit map, successively coding a code indicative of the degree of matching and all of a unit pattern group of a type corresponding to the code.

19. The coding method as set forth in claim 18, further comprising the step of, when said unit pattern is determined to match said first library pattern and is not the same as said first library pattern or when said unit pattern unmatches both said first library pattern and second library pattern, newly registering said unit pattern as the first library pattern.

20. A computer readable memory which stores a coding program for extracting unit patterns from input binary image data and coding said unit patterns based on a result of sequentially conducted pattern matching with a library pattern, said coding program comprising the steps of:

storing a first library pattern updatable based on said unit pattern, comparing said unit pattern with the first library pattern, and as to a mark pattern determined to be matching, when the number of match error pixels of the pattern is not more than a prescribed value, without coding the bit map, coding an identification ID of a matching bit map in a library and an identification flag indicating that the number of match error pixels is not more than the prescribed value.

21. The computer readable memory which stores a coding program as set forth in claim 20, wherein said coding program further comprises the step of, when said unit pattern is determined to match said first library pattern, newly registering said unit pattern as the first library pattern.

22. A computer readable memory which stores a coding program for extracting unit patterns from input binary image data and coding said unit patterns based on a result of sequentially conducted pattern matching with a library pattern, wherein said coding program comprises the steps of:

storing a first library pattern updatable based on said unit pattern, storing a second library pattern of a font designated in advance, comparing said unit pattern with the first library pattern and the second library pattern, when said unit pattern is determined to match said first library pattern and is not the same as said first library pattern, newly registering said unit pattern as the first library pattern, and as to a mark pattern determined to be matching, when the number of match error pixels of the pattern is not more than a prescribed value, without coding the bit map, coding an identification ID of a matching bit map in a library and an identification flag indicating that the number of match error pixels is not more than the prescribed value.

23. The computer readable memory which stores a coding program as set forth in claim 22, wherein said coding program further comprises the step of, when said unit pattern is determined to match said first library pattern and is not the same as said first library pattern or when said unit pattern unmatches both said first library pattern and second library pattern, newly registering said unit pattern as the first library pattern.

24. A computer readable memory which stores a coding program for extracting unit patterns from input binary image data and coding said unit patterns based on a result of sequentially conducted pattern matching with a library pattern, wherein said coding program comprises the steps of:

storing a first library pattern updatable based on said unit pattern, storing a second library pattern of a font designated in advance, comparing said unit pattern in a predetermined coding range with the first library pattern and the second library pattern, when said unit pattern is determined to match said first library pattern and is not the same as said first library pattern, newly registering said unit pattern as the first library pattern, as to a mark pattern determined to be matching, when the number of match error pixels of the pattern is not more than a prescribed value, correlating an identification ID of a matching library and an identification ID of a bit map of the matching library, and classifying all the unit patterns in said range into types according to degrees of matching and sequentially for each type, without coding the bit map, successively coding a code indicative of the degree of matching and all of a unit pattern group of a type corresponding to the code.

25. The computer readable memory which stores a coding program as set forth in claim 24, wherein said coding program further comprises the step of, when said unit pattern is determined to match said first library pattern and is not the same as said first library pattern or when said unit pattern unmatches both said first library pattern and second library pattern, newly registering said unit pattern as the first library pattern.

* * * * *